March 1, 1927. 1,619,478
J. LEDWINKA
MOTOR VEHICLE
Filed Sept. 18, 1922  3 Sheets-Sheet 2
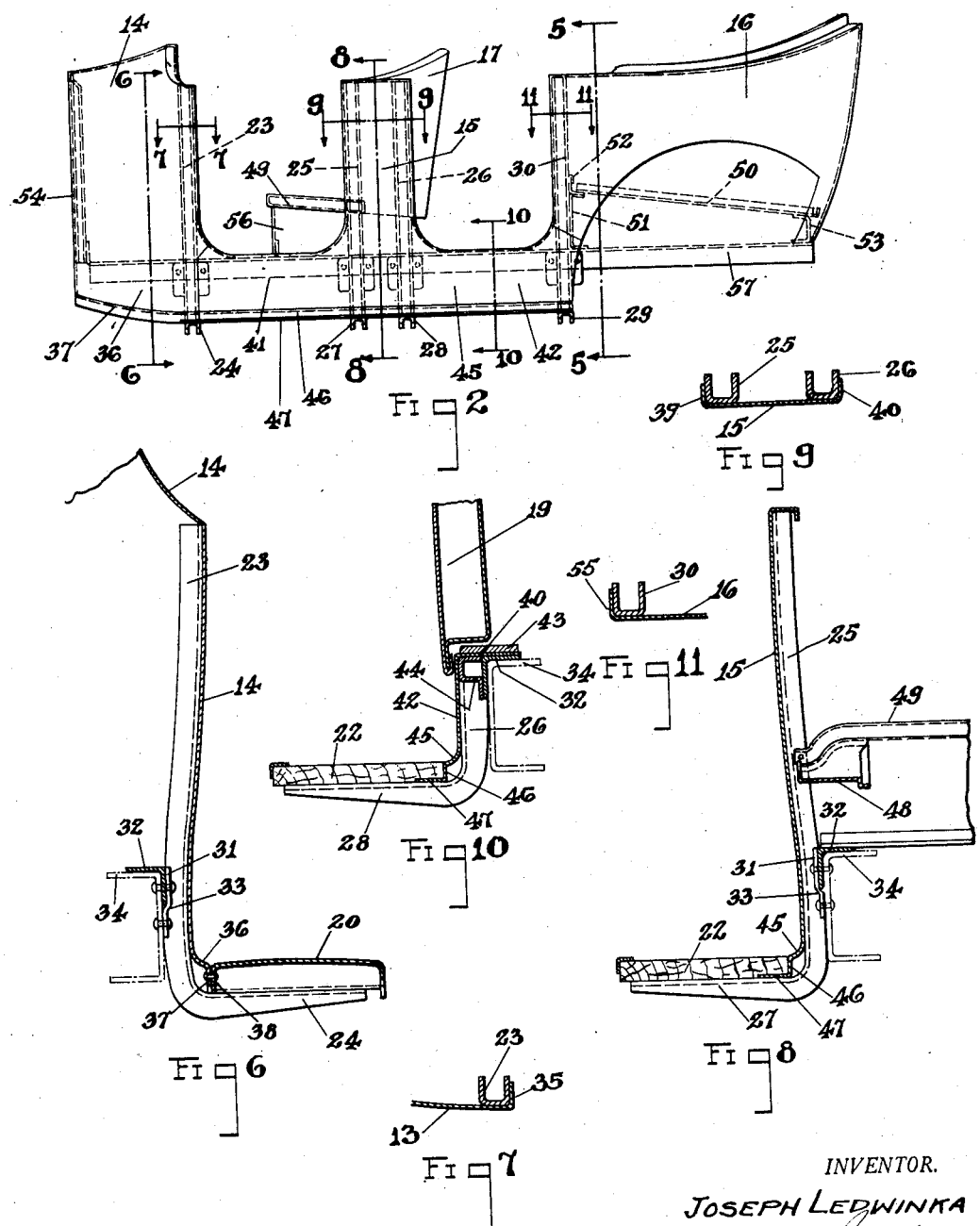
WITNESS:—
Walter M. Trout
INVENTOR.
JOSEPH LEDWINKA
BY
C. B. Desjardins
ATTORNEY March 1, 1927.  J. LEDWINKA  1,619,478
MOTOR VEHICLE
Filed Sept. 18, 1922  3 Sheets-Sheet 3
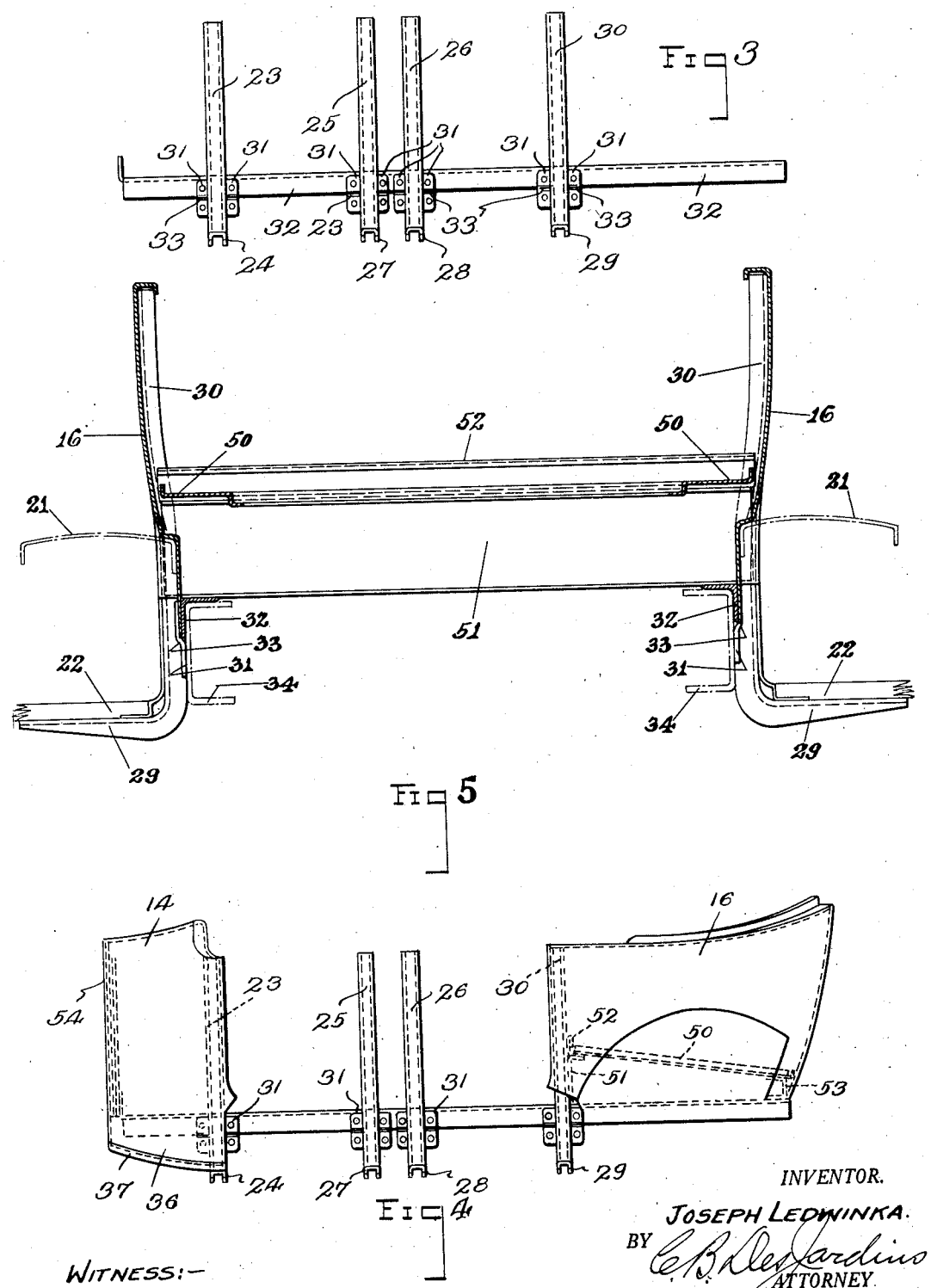
INVENTOR.
JOSEPH LEDWINKA.
BY
ATTORNEY
WITNESS:—
Walter M. Prout.

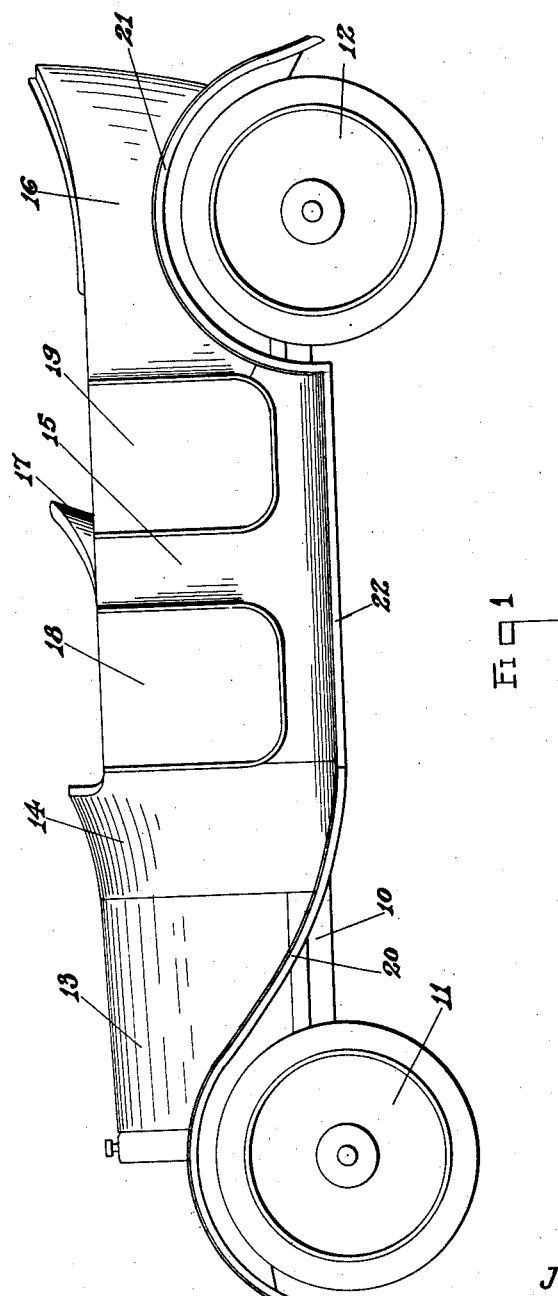

Patented Mar. 1, 1927.

1,619,478

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MOTOR VEHICLE.

Application filed September 18, 1922. Serial No. 588,807.

My invention relates to improvements in motor vehicles and has to do, more particularly, with improvements in the construction of bodies for motor vehicles and the means for attaching such bodies to the chassis of the motor vehicle.

One of the principal objects of my invention is to provide an improved automobile body construction which shall have a better and more attractive appearance than the bodies heretofore made inasmuch as unsightly breaks, cracks or joints in the side of the body are eliminated and the side of the body constitutes a substantially unbroken surface from the upper edge thereof to the running board.

A further object of my invention is to provide an improved body construction of such a nature that its use permits the elimination of the side splashers and running board supports heretofore used in motor vehicle construction.

Another object of my invention is to provide an automobile body of such construction that it supports and carries the usual running board and fills the space between the body sills and the running board so as to cover and conceal the chassis frame of the automobile.

A further object of my invention is to provide an automobile body construction in which the door posts are extended downwardly below the body sills and the chassis frame of the automobile and form supports for the running board.

Another object of my invention is to provide an automobile body construction of such a nature that the floor of the body and the seat may be lowered and brought nearer to the ground, thus lowering the center of gravity of the body and increasing the efficiency and ridability of the automobile equipped with it.

A further object of my invention is to provide an automobile body construction which is simple, strong and durable and which can be manufactured at a comparatively low cost.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view in side elevation of a motor vehicle having a body mounted thereon which is constructed in accordance with my invention.

Fig. 2 is a view of the body in side elevation, the doors having been removed.

Fig. 3 is a view of the body framework in side elevation.

Fig. 4 is a view similar to Fig. 2 but with the side panels and front seat removed so as to show the body sills and the door posts to which the side panel is secured.

Fig. 5 is a vertical, sectional view, taken on the line 5—5 of Fig. 2.

Fig. 6 is a detail, sectional view through the forward portion of the body, taken on the line 6—6 of Fig. 2.

Fig. 7 is a detail, sectional view, taken on the line 7—7 of Fig. 2.

Fig. 8 is a vertical, sectional view through the side of the body, taken on the line 8—8 of Fig. 2.

Fig. 9 is a detail, sectional view, taken on the line 9—9 of Fig. 2.

Fig. 10 is a sectional view through the side of the body at the rear door opening, said view being taken on the line 10—10 of Fig. 2, and, Fig. 11 is a detail, sectional view, taken on the line 11—11 of Fig. 2.

In the drawings, the same reference numerals refer to the same parts throughout the several views and the sectional views are taken looking in the direction of the arrows at the ends of the section lines.

Automobile bodies, as at present constructed, include a body shell made up of sheet metal panels, the lower edge portions of which are bent under and secured to the body sills. The body, thus constructed, is mounted so that the body sills rest on and are supported by the chassis frame of the automobile. At each side of the car, it is customary to provide running boards which are supported by suitable hangers or brackets secured to the chassis frame. These running boards are supported about on a line with the centers of the wheels and, consequently, are positioned some distance below the top of the chassis frame and the lower edge of the body. It is customary to fill the space between the lower edge of the body and the running boards by sheet metal side splashers, which extend from the lower edge of the body to the running board, conceal the chassis frame and prevent mud and water being splashed from the wheels upon the running board. One objection to this construction is that an unsightly crack or joint is formed at the side of the body, beneath the door openings, where the side splasher meets the lower edge of the body. This joint accumulates dirt and mud and detracts from the smooth stream-line effect which body designers strive to get in order to meet with the favor of the automobile trade. It is among the purposes of my invention to provide a body construction in which all such joints or cracks are eliminated and the side of the body extends in a substantially unbroken surface, except for the door openings, from the upper edge thereof to the running board. This gives a smooth stream-line effect which is highly attractive. It is also among the purposes of my invention to eliminate the side splashers, which have been used heretofore, and to provide downwardly-extending portions on the side panels of the body shell, which fill the space formerly occupied by these side splashers. It is also among the purposes of my invention to eliminate the running board supports or brackets, which have been employed heretofore, and to provide means for supporting the running boards directly from the body construction. It is highly desirable, in automobile body design, to keep the center of gravity of the body as low as possible, as this adds to the efficiency of the motor vehicle on which the body is mounted and makes it ride easier, inasmuch as the tendency to side-sway is reduced. It is among the purposes of my invention to provide an automobile body construction of such a nature that the floor line and the seats may be lowered, bringing them closer to the chassis frame and thus lowering the center of gravity.

I propose to accomplish the purposes of my invention by providing an automobile body having a plurality of door posts which may be rigidly connected together by side frame members constituting the body sills and disposed one at each side of the body extending longitudinally thereof. These side frame members may be connected together by suitable cross members, for the purpose of reinforcing the frame construction. I propose to extend the lower end portions of the door posts below the body sills and outside the chassis frame and to connect the running boards to the lower ends of these door posts. A convenient arrangement for effecting this connection between the door posts and the running boards consists in turning outwardly the lower ends of the door posts and mounting the running boards upon these out-turned ends. I propose to mount the body panels, forming the body shell, upon this framework in the usual manner but, instead of stopping the panels forming the sides of the body at the body sills, I propose to extend them downwardly to the running boards so that the sides of the body form a substantially unbroken surface from the top of the body to the running boards. I also propose to connect the body to the chassis frame through these door posts and, to that end, the door posts extend down alongside the chassis frame and means may be provided for directly fastening the door posts to said chassis frame.

Referring to the numbered parts of the accompanying drawing, in which I have illustrated a body forming one embodiment of my invention mounted on a motor vehicle, the chassis frame, 10, is supported by the usual wheels, 11 and 12. The body is secured to and mounted on this chassis frame and includes the cowl panel, 14, the side panels, 15, one at each side of the body, the tonneau panel, 16, which is curved to form the rear portion of the body, and the front seat, 17, which extends between and is connected to the side panels, 15. The front doors, 18, and the rear doors, 19, are mounted in the front and rear door openings, respectively. The numeral 13 indicates the hood which covers the motor. The front fenders, 20, extend over the front wheels, 11, and are connected to the chassis frame, 10, and to the cowl panel, 14, as will be described hereinafter. The rear fenders, 21, extend over the rear wheels, 12, and are connected to the tonneau panel, 16. The running boards, 22, one at each side of the body, extend from the front fenders to the rear fenders about on a level with the centers of the wheels, as shown in Fig. 1.

The body includes a framework on which the various sheet metal body panels making up the body shell are mounted and rigidly secured. This framework includes the door posts, 23, at the front of the front door openings, door posts, 25, at the rear of the front door openings, the door posts, 26, at the front of the rear door openings, and the door posts, 30, at the rear of the rear door openings. Of course, similar door posts are provided at each side of the body. These door posts are connected together by the body sills, 32, to which the door posts are secured and by various cross members which tie the body sills together at such points as may be desired. Each of these door posts extends downwardly below the body sill, 32, to which it is fastened, and is provided with a laterally-extending, out-turned end, forming a support for the running board. Thus, the lower end of the door post, 23, is turned outwardly, forming the support, 24, the lower ends of the door posts, 25 and 26, are turned outwardly, forming the supports, 27 and 28, and the lower end of the door post, 30, is turned outwardly, forming the support, 29. The out-turned ends, or supports, 24, 27, 28 and 29, all lie in substantially the same plane and are located considerably below the body sills and the upper surface of the chassis frame of the automobile on which the body is mounted. These various door posts may well be of sheet metal and of channel cross section, as indicated in the various sectional views in the accompanying drawing. I am not to be restricted, however, to metal door posts, or to door posts of the channel shape illustrated, although I find this particular form very effective for carrying out my invention. At the points where the door posts are to be connected to the body sills, 32, I find it convenient to form laterally-extending flanges, 31, on the door posts, which flanges lie against the body sills, 32, and may be riveted thereto. I find it desirable to employ sheet metal angle members for the body sills, 32, as shown in Figs. 5, 6, 8 and 10 of the drawings, to which I am not restricted, however, and these angle members rest upon the upper surfaces of the chassis frame, 34, as shown in such views, while the door posts extend downwardly outside of the chassis frame. The lower portions of the attaching flanges, 31, may be offset at 33, so as to bring them into flat bearing contact with the sides of the chassis frame, 34, and the body may be secured to such chassis frame by bolts passed through these flanges and through the side wall of the chassis frame member.

The cowl panel, 14, is formed to the desired shape and contour required for that portion of the body shell in front of the front door opening and the rear side portions of the cowl panel may be flanged inwardly, at 35, and rigidly secured to the door posts, 23, by welding or otherwise. The forward portion of the cowl structure is stiffened and reinforced by the shroud pan, 54, connected with the forward edges of the cowl panel, 14, in the usual manner. The lower side portions of the cowl panel, 14, extend below the body sills, 32, are curved outwardly somewhat at 36 and terminate in the flange, 37, against which the flange, 38, of the front fender, 20, is adapted to be seated and secured. The flange, 37, is curved upwardly, longitudinally, as shown in Fig. 2, so as to conform with the sweep of the fender extending from above the wheel to the forward end of the running board, 22.

The side panels, 15, are provided with vertical flanges, 39, and 40, which are applied to and secured, by welding or otherwise, to the door posts, 25 and 26, as shown in Fig. 9. The side panels, 15, include the portions, 41 and 42, which lie beneath the front and rear door openings and extend from the lower edges of such openings below the body sills to the running boards. The inturned flange, 39, formed on the side panel, 15, at the rear edge of the front door opening, is continued, at the bottom of the front door opening, on the upper edge of the portion, 41, of the side panel. A threshold strip, 43, may be applied to this inturned flange so as to reinforce and strengthen it at the door threshold. The flange, 40, at the forward edge of the rear door opening is extended, similarly, across the bottom of the rear door opening, on the upper edge of the portion, 42, of the side panel, and a similar threshold strip, 43, may be applied thereto. As shown in Fig. 10, the side panel, 15, including the portions, 41 and 42, thereof is spaced away from the sides of the body sill and the chassis frame member by the door posts, 25 and 26, which extend between said frame member and the side panels. The flanges, 39 and 40, on the side panels, are applied externally to and secured to the upper surface of the body sill, 32, at the door openings, as shown in Fig. 10, and a channel member, 44, may be inserted between the body sill, 32, and the side panel, at the door opening, so as to reinforce and strengthen the construction at this point. The side panel, 15, extends downwardly below the body sill, 32, and the chassis frame member, 34, and the lower portion of the side panel is curved outwardly somewhat, at 45, and then extends downwardly, at 46, and outwardly, forming the flange, 47, which rests on the out-turned portions, 24, 27, 28 and 29 of the several door posts. The running board, 22, is supported on these several out-turned portions of the posts, as shown in Figs. 8 and 10, and is secured thereto in any suitable manner.

A front seat pan, 48, is supported from the body sills by the heel board, 56, and by suitable cross members, in the usual manner. The upper edge of said seat pan has a cushion retaining strip, 49, secured thereto with its ends secured to the door posts, 25. The front seat panel, 17, is rigidly secured to and connects the door post, 26, and also helps to tie the two sides of the body together. The tonneau panel, 16, is shaped to the desired form and contour to form the rear portion of the body shell and the forward edge portions of said panel are flanged inwardly, at 55, and rigidly secured, by welding or otherwise, to the door posts, 30. The portions, 57, at the sides of the tonneau panel, 16, are applied externally to and rigidly secured to the rear portions of the body sills, 32, by welding or otherwise. The rear ends of the body sills, 32, may be connected by the cross member, 53, and a seat pan, 50, is supported, at its rear edge, by said cross member and, at its forward edge, by the heel board, 51, the ends of which are rigidly connected to the door posts, 30, so that it helps to tie the two parts of the body together. A cushion retaining strip, 52, is fastened to the front edge of the seat pan, 50.

From a consideration of the structure which I have described in the foregoing pages, it will be apparent that the side of the body extends in a substantially unbroken surface, except for the door openings, from the upper edge of the body to the running board. This is very important because it greatly enhances the good looks of the body and eliminates the unsightly and unattractive joint or crack which has, heretofore, existed in all bodies on the market at the points where the side splashers are connected to the chassis frame. This construction not only removes this unsightly joint or crack in the side of the body but it also makes the body appear deeper and larger than it really is, so that the body gives the effect of those used on large, underslung cars, in which the lower line of the body is nearer the ground. It is to be noted that the running boards are fastened directly to the lower ends of the door posts, so that the running board supports are eliminated and the door posts themselves form the running board supports. This is important because it results in reducing the number of parts and greatly expedites and facilitates the assembling of the automobile. The running boards are also given more adequate support than in constructions where they are supported by brackets secured to the chassis frame. It is to be noted that the side splashers heretofore used in automobile construction have also been eliminated, thus reducing the number of parts still further. The door posts form the means for attaching the body to the chassis frame and, therefore, the supporting brackets, such as have been employed heretofore in many cases, are eliminated.

In this construction, the side sills are formed of angle members which rest upon the upper sides of the chassis frame members and the body sills, therefore, do not require any substantial space above the chassis frame and the floor of the body can be brought down practically to the level of the chassis frame and the seat pans correspondingly lowered. The result is that the floor of the body and the seats may be positioned nearer the ground than has been the case heretofore and the center of gravity is correspondingly lowered.

In the accompanying drawings. I have illustrated an embodiment of my invention in an automobile body constructed entirely of metal but I am not to be restricted to such a construction as my invention is also applicable to bodies of composite construction, in which wooden posts or wooden body sills are used. I have shown my invention embodied in a touring car body but it is not to be restricted thereto as it is applicable to both touring car and roadster bodies and, also, to closed bodies, such as, sedan, coupé and limousine bodies.

I am aware that the automobile body which I have shown herein may be changed considerably, without departing from the spirit of my invention, and, therefore, I claim my invention broadly, as indicated by the appended claims.

Having thus described my invention, what I claim as new and useful and desire to secure by Letters Patent is:

1. In a motor vehicle, the combination with the chassis frame and running boards at the sides of the motor vehicle, of a body mounted on said chassis frame and including a frame work having longitudinally and vertically disposed frame members, a body shell made up of a plurality of sheet metal body panels secured to said framework, certain of the panels forming the sides of the body being extended downwardly to the running boards, said vertically disposed frame members being secured to the chassis frame.

2. In a motor vehicle, the combination with the chassis frame and running boards at the sides of the motor vehicle, of a body mounted on said chassis frame and comprising a framework, including a plurality of door posts, and a body shell made up of a plurality of sheet metal body panels secured to said door posts, certain of the panels forming the sides of the body being extended downwardly to the running boards and concealing the chassis frame said door posts being secured rigidly to said chassis frame.

3. In a motor vehicle, the combination with the chassis frame of a body mounted on said chassis frame and comprising a framework, including a plurality of vertically extending members and a pair of longitudinally-extending body sills, one at each side of the body to which said vertically disposed members are rigidly connected, and a body shell made up of a plurality of sheet metal body panels secured to said framework, certain of the body panels forming the sides of the body being extended downwardly below the body sills and concealing said sills and the chassis frame said vertically extending frame members being connected to the chassis frame.

4. In a motor vehicle, the combination with the chassis frame, running boards and front fenders, of a body mounted on said chassis frame and comprising a framework including sill members and vertically disposed members rigidly connected together and a body shell made up of a plurality of body panels rigidly secured to said framework, said shell including a cowl panel which is extended below the body sills and connected to the front fenders and running boards.

5. An automobile body comprising a framework, including a plurality of door posts, and a pair of longitudinally-extending body sills, one at each side of the body, and a body shell made up of a plurality of sheet metal body panels curved or bent to the contour of the body curvature secured to said framework, the lower ends of said door posts being extended downwardly below the body sills and outwardly to form running board supports.

6. In a motor vehicle, the combination with the chassis frame, of a body mounted on said chassis frame and including a plurality of vertically disposed frame members and a body shell made up of a plurality of sheet metal body panels secured to said members, the lower ends of said vertically disposed frame members applied and connected to and extended downwardly on the outside of said chassis frame, and running boards secured to the lower ends of said door posts independently of said chassis frame.

7. An automobile body comprising a framework, including a plurality of door posts, a body shell made up of a plurality of sheet metal body panels secured to said framework, the lower ends of said door posts being turned outwardly, and running boards mounted on said outwardly-turned ends of the door posts.

8. An automobile body comprising a framework, including a plurality of door posts, and a body shell made up of a plurality of sheet metal body panels secured to said door posts, the lower ends of said door posts adapted to be applied and secured to the chassis frame of an automobile.

9. In a motor vehicle, the combination with the chassis frame, of a body mounted on said chassis frame, and including a plurality of door posts, sills and cross members connected together to form a body frame structure, and a body shell made up of a plurality of sheet metal body panels secured to said door posts, said sills resting on the chassis frame and the door posts being fastened directly to the chassis frame to fasten the body thereon.

10. In a motor vehicle, the combination with the chassis frame, of a body, including a plurality of door posts directly fastened to said chassis frame and extending downwardly on the outside of said chassis frame, running boards secured to the lower ends of said door posts independently of said chassis frame, and a body shell made up of a plurality of sheet metal body panels secured to said door posts, certain of said panels extending downwardly to the running boards so as to conceal the chassis frame and provide a substantially uninterrupted surface for the side of the body.

11. In a motor vehicle, the combination with the chassis frame, of a body including a plurality of door posts connected directly to the chassis frame, the lower ends of said door posts being extended downwardly outside the chassis frame and turned outwardly, a body shell including a plurality of sheet metal body panels applied externally and rigidly secured to said door posts, certain of said panels at the sides of the body being extended downwardly to the out-turned portions of said door posts, and running boards mounted on said out-turned portions of the door posts.

12. In a motor vehicle, the combination with the chassis frame, of a body including a plurality of door posts fastened to said chassis frame, and extending downwardly on the outside thereof, and a body shell made up of a plurality of sheet metal body panels applied externally and secured rigidly to said door posts, said panels including a cowl panel and side panels, running boards secured to the lower ends of said door posts, front fenders mounted on said chassis frame and connected at their rear ends to the forward ends of the running boards, said side panels being extended downwardly on the outside of the chassis frame to the running boards, and said cowl panel being extended downwardly and having its lower edge portions connected to rear portions of said front fenders.

In testimony whereof, I affix my signature.

JOSEPH LEDWINKA.